United States Patent
Eidloth et al.

(10) Patent No.: US 8,659,476 B2
(45) Date of Patent: Feb. 25, 2014

(54) DEVICE AND METHOD FOR DETERMINING THE DISTANCE AND/OR ORIENTATION OF A MOVEABLE OBJECT

(75) Inventors: Andreas Eidloth, Erlangen (DE); Hans Adel, Stein (DE); Jörn Thielecke, Erlangen (DE); Alexander Popugaev, Erlangen (DE)

(73) Assignees: Fraunhofer-Gesellschaft zur Foerderung der angewandten Forschung e.V., Munich (DE); Friedrich-Alexander-Universität Erlangen-Nürnberg, Erlangen (DE)

( * ) Notice: Subject to any disclaimer, the term of this patent is extended or adjusted under 35 U.S.C. 154(b) by 199 days.

(21) Appl. No.: 13/055,770

(22) PCT Filed: Jul. 27, 2009

(86) PCT No.: PCT/EP2009/005630
§ 371 (c)(1),
(2), (4) Date: Jan. 25, 2011

(87) PCT Pub. No.: WO2010/009906
PCT Pub. Date: Jan. 28, 2010

(65) Prior Publication Data
US 2011/0122024 A1 May 26, 2011

(30) Foreign Application Priority Data
Jul. 25, 2008 (DE) .......... 10 2008 035 440

(51) Int. Cl.
*G01S 1/00* (2006.01)
*H01Q 21/24* (2006.01)
*H04B 7/10* (2006.01)

(52) U.S. Cl.
USPC ............ 342/385; 342/361; 342/458; 342/463

(58) Field of Classification Search
USPC ......... 342/458, 463–465, 361, 385, 386, 417, 342/423, 432
See application file for complete search history.

(56) References Cited

U.S. PATENT DOCUMENTS

| | | | | |
|---|---|---|---|---|
| 2,925,596 | A | * 2/1960 | Zisler | ............................ 342/363 |
| 3,540,045 | A | 11/1970 | Taylor | |
| 3,836,973 | A | 9/1974 | Shnitkin et al. | |
| 5,056,106 | A | * 10/1991 | Wang et al. | ................... 375/130 |
| 6,236,849 | B1 | * 5/2001 | Reudink et al. | ............... 455/342 |
| 6,590,536 | B1 | 7/2003 | Walton | |
| 7,495,614 | B2 | * 2/2009 | Small | ............................ 342/458 |
| 2003/0001775 | A1 | 1/2003 | Turner | |
| 2005/0225451 | A1 | 10/2005 | Inui | |

FOREIGN PATENT DOCUMENTS

| | | |
|---|---|---|
| DE | 10055289 A1 | 5/2002 |
| DE | 102007062726 A1 | 7/2009 |
| JP | 06130138 A | 5/1994 |

OTHER PUBLICATIONS

International Search Report for Application No. PCT/EP2009/005630 mailed Oct. 20, 2009.

* cited by examiner

*Primary Examiner* — Cassie Galt

(57) ABSTRACT

A device and method for determining a distance and/or orientation of a movable object includes a transmitter that is located on the object and a receiver. One of the transmitter and the receiver has an antenna having a known polarization plane. The other of the transmitter and the receiver has a counterclockwise circular polarized antenna and a clockwise circular polarized antenna.

19 Claims, 5 Drawing Sheets

DEVICE AND METHOD FOR DETERMINING THE DISTANCE AND/OR ORIENTATION OF A MOVEABLE OBJECT

CROSS-REFERENCE TO RELATED APPLICATIONS

The present application is a national phase application of PCT Application No. PCT/EP2009/005630 filed pursuant to 35 U.S.C. §371, which claims priority to DE 10 2008 035 440.6 filed Jul. 25, 2008. Both applications are incorporated herein by reference in their entirety.

TECHNICAL FIELD

The invention relates to an apparatus and to a method for determining the distance and/or orientation of a movable object.

BACKGROUND

It is important, in navigation or in metrology to know the distance or the change in distance with respect to a fixed location and/or the orientation of a movable object in space. A plurality of approaches are known today for determining the alignment of a movable object. For example, the orientation and movement of an object may be determined with the aid of inertial sensor systems, i.e. by magnetic field sensors, gyroscopes or acceleration sensors, and such a method and such an apparatus are respectively described in EP 1 521 165 A2. A disadvantage is that an unknown bias or offset of the sensors is contained in the measured variables which results in errors in the position and orientation result which increase over time. The error is usually determined and corrected by support measurements of other systems. Camera-based systems represent a further starting point for determining the orientation and, position of an object. In this respect, at least three markings are applied to the measured object which are detected by cameras and whose position and location toward one another are determined, whereby the measured object can be defined in space. Examples for this are described in DE 698 04 128 T2 and WO 99/21134.

An apparatus for measuring the alignment of a ship is described in GB 2 130 040 A using the GPS system. A rotating antenna or an arrangement of a plurality of antennas which behave like a rotating antenna by switching over in this respect receives radio signals from a satellite and the direction of incidence of the signal can be determined via the phase comparison between a rotation period of the antenna and a phase measurement, Doppler measurement, amplitude measurement or distance measurement which have a periodic profile. The alignment of the ship can be determined from this with the aid of the position of the satellite and of the ship's own position.

SUMMARY

The invention is directed to an apparatus and a method for determining the distance and/or orientation in accordance with a different measurement principle which permit a relatively simple evaluation with satisfying results.

In some embodiments, at least one transmitter and at least one receiver are used, in the apparatus and in the method, with a respective one of both having an antenna with a known polarization plane and the other of both (transmitter and receiver) having a left-hand circularly polarized antenna and a right-hand circularly polarized antenna, with the term left-hand antenna and right-hand antenna being intended to cover every antenna arrangement with which left-hand and right-hand polarizations can be generated. The phasings are determined from the two received signals and the transmitted signal and are compared with one another. The comparison takes place by difference formation of the phasings between the received signal and the transmitted signal. Two measured phase values for the two receiver modules are thereby obtained. The measurement process is thus based on a pure evaluation of the carrier phase. No modulation of the transmitted signal is necessary to acquire the measured values. A modulation of the transmitted signal is, however, advantageous in a number of respects to improve the precision and resilience and to allow the separability of the symbols facilitated in the following.

The distance and the orientation of the movable object can subsequently be calculated from the determined measured phase values. If no starting position is known, an arbitrary starting point is assumed and the distance change and the orientation change is determined. Absolute distances and orientations can thus also be determined with the aid of known positions and orientations of the object at least one point in time.

The one-dimensional orientation change or distance change can be determined using the simplest arrangement, i.e. a transmitter and a receiver, with the transmitter time and the receiver time then being synchronized with one another or by determining the time difference and correcting the error by a process known per se. In some embodiments, a reference transmitter, having a known orientation, or a corresponding reference receiver are used in an advantageous embodiment for the one-dimensional absolute orientation in dependence on the embodiment.

In some embodiments, if the transmitter and the receiver are not synchronized with one another, an additional receiver is provided in order to eliminate the unknown transmission time using the TDOA (time difference of arrival).

When using the method in accordance with the invention, the phasings of two received signals are determined with respect to the phasing of the transmitter with a defined frequency by at least one receiver and are compared with one another. This term of comparison is also intended to cover intermediate processes, e.g. the elimination of the unknown frequency offset with non-synchronized transmitter/receiver using the TDOA method.

An arrangement can be provided as a simple embodiment of a circularly polarized antenna including two crossed linear antennas with a phase shifter, preferably a 90° phase shifter.

In some embodiments, depending on the system selected, a multidimensional localization system can be provided having a plurality of receivers or transmitters with the circularly polarized antennas, wherein at least four receivers or transmitters having the circularly polarized antennas may be arranged in spatial distribution for a detection of the three-dimensional orientation of the movable object in space if no synchronization is present between the transmitter and the receiver.

In some embodiments, the signal shape of the two transmitted signals is selected in a transmitter having the two circularly polarized antennas so that the signal shape can be distinguished at the receiver. An encoding in order to achieve, orthogonal code sequences are possible such as are used in CDMA (code division multiple access) methods. However, different carrier frequencies can also be used which are rigidly coupled, that is, originate from one clock source. The use of burst-like modulations which alternately use the transfer channel is also conceivable as is the case with TDMA (time division multiple access) methods.

BRIEF DESCRIPTION OF THE FIGURES

Embodiments of the invention are shown in the drawing and will be explained in more detail in the following description. There are shown

DETAILED DESCRIPTION

Figure 1:
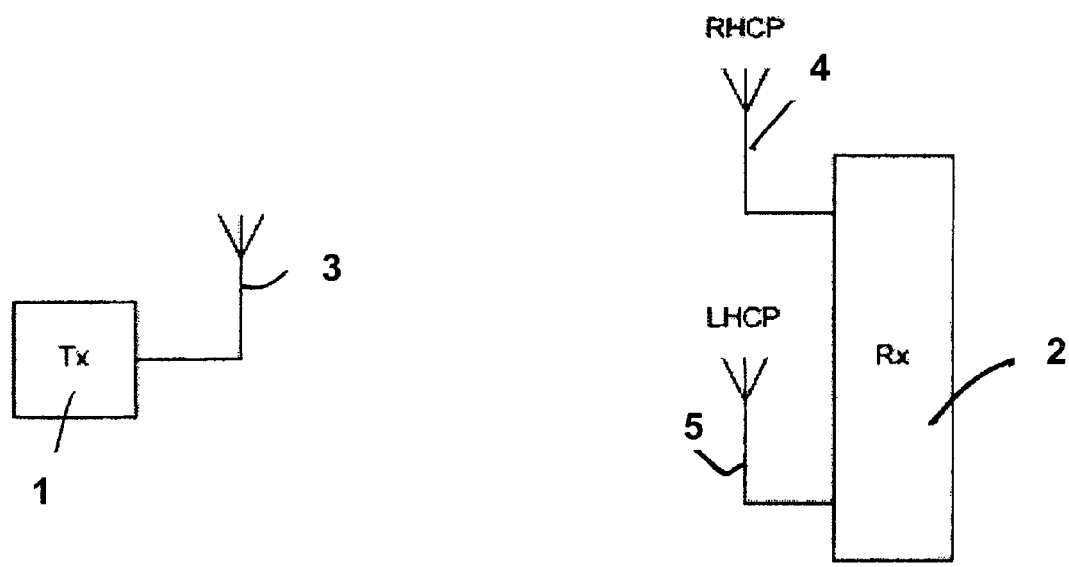
FIG. 1 shows a schematic diagram of the apparatus in accordance with the invention in accordance with a first embodiment.

An embodiment of the invention that should determine the distance and/or the orientation of a movable object at a preset point is shown in principle in FIG. 1 in this respect, the movable object has a transmitter 1 that is arranged changeably in its position with respect to a fixed receiver 2. The transmitter is connected to an antenna 3 via which a transmitted signal generated in the transmitter 1 is emitted, with the antenna 3 being linearly polarized, i.e. emitting in a known linear polarization plane. The transmitter 1 generates an arbitrary signal with a defined frequency. In some embodiments, the signal is a signal modulated onto a carrier having a defined frequency $f_0$. In this respect, the type of modulation can be selected in accordance with the circumstances.

The receiver 2 is connected to two antennas 4, 5 that are each associated with a reception module which is not shown. The antennas 4, 5 are circularly polarized antennas, with the antenna 4 having right-hand circular polarization and the antenna 5 having left-hand circular polarization. Different antenna configurations can naturally be used that can generate the desired polarization. The two receiver paths or receiver modules only differ in the direction of rotation of the rotating field strength vector of the two antennas. The receiver 2 is provided with or is connected to an evaluation device, not shown.

The antennas 4, 5 receive the transmitted signal having a defined frequency $f_0$ that is transmitted by the transmitter via the antenna 3. The receiver 2 or the evaluation unit determines the phasing of the carrier frequency of the two received signals with respect to the phasing of the defined frequency $f_0$ of the transmitter 1. In some embodiments, in order to make this comparison possible, the transmitter and receiver clocks are synchronized with one another, i.e. the clock sources are connected to one another with phase locking. This can be done by accessing the same reference clock, e.g. via a glass fiber network or via radio or by using atomic clocks, with a subsequent correction or control optionally having to be carried out.

In some embodiments, measured values are obtained by comparing the phasing of the received signal of each receiver module with the phase of the transmitted signal and will be called measured phase values $\phi_{RHCP}$ and $\phi_{LHCP}$ (rad) in the following.

Different measured phase profiles are obtained when the movement of the transmitter 1 is taken into account:

If the transmitter 1 moves toward the receiver or away from the receiver, the determined measured phase values of the two modules of the receiver 2 change in the same way. If the transmitter 1 thus moves toward the receiver 2 by one wavelength of the emitted transmitted signal, both receiver modules of the receiver 2 register a phase increase of 360°. These processes are known as carrier phase measurement in localization systems. However, it should be noted in this respect that the phase repeats at an interval of one wavelength so that an ambiguity results here.

Figure 2:
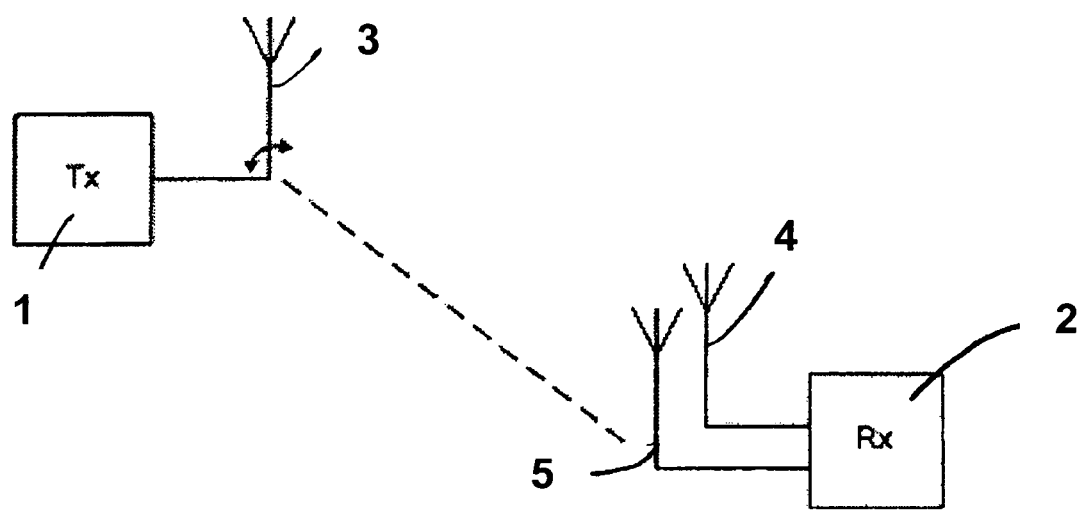
FIG. 2 shows a representation in accordance with FIG. 1, in which the polarization plane of the transmission antenna is rotated about the transmitter/receiver axis.

The rotation of the transmitter antenna about the transmitter/receiver axis effects a rotation of the linear polarization. If the transmitter 1 rotates physically, the alignment of the polarization plane changes, which is registered at the receiver 2 and is converted into measured variables. The angle of incidence of the polarization plane onto the reception antennas carries the information to be measured. On a rotation of the known polarization plane of the transmitter 1 about the transmitter/receiver axis, as is indicated in FIG. 2, an increase in the phase is registered with respect to the receiver module connected to the antenna 4 and an equally large decay is registered in the receiver module connected to the antenna 5. Thus, if $\phi_{RHCP}$ increases in value, then the value of $\phi_{LHCP}$ drops accordingly. On a rotation of the transmitter 1, for example about the axis of rotation shown in FIG. 2, changes result in the measured phase values of 360° in amount, with the two measured values behaving oppositely to one another. Which measured phase value rises or falls depends on the direction of rotation of the transmitter 1. The direction of rotation of the transmitter 1 can thus be determined with the aid of the change in the measured phase values. With a known direction of rotation, a change in orientation, i.e. a relative alignment, can thus be determined using the apparatus of FIG. 1 or FIG. 2 respectively.

The distance between the transmitter 1 and the receiver 2 can be calculated as follows:

$$x = \frac{\lambda}{2\pi} \cdot \frac{\varphi_{RHCP} + \varphi_{LHCP}}{2} + x_0$$

Here, $\lambda$ corresponds to the wavelength of the signal emitted by the transmitter 1 in meters and $X_0$ corresponds to a distance offset, likewise in meters, with the distance value $X_0$ being selected so that x corresponds to the actually measured distance. The two measured phase values $\phi_{RHCP}$ and $\phi_{LHCP}$ are not yet meaningful in the first measured value recording since signal propagation times in the system influence the values, e.g. due to cable lengths. The value x must thus initially be determined to calculate the distance offset $x_0$ with the aid of the measured phase values. From this time onward, $x_0$ is then defined and the position x can then be determined with the aid of the phase measurement. This will then always be relative to the first position. In modern navigation systems, the value $x_0$ is estimated over a plurality of measurement cycles until a sufficient precision and security is achieved. Algorithms satisfying this purpose are known in the literature. A simple average determination over a plurality of measured values can be carried out, for example. A Kalman filter can equally estimate the status value and its uncertainty.

As was already stated above, it should be noted in the measurement of the phase values that the solution of the equation is likewise ambiguous due to the $2\pi$ ambiguity of the measured phase values. This ambiguity can, however, be prevented by the so-called phase unwrapping of the relative measured phase values.

The orientation of the transmitter 1 which is one-dimensional in the embodiment of FIG. 1 and FIG. 2 can be calculated by the following equation:

$$\Omega = \pm \frac{\varphi_{RHCP} - \varphi_{LHCP}}{2} + \Omega_0$$

Here, $\Omega$ corresponds to an angle of rotation in radians. The result of the equation can in turn be adapted using $\Omega_o$ so that $\Omega$ corresponds to the angle of rotation in a coordinate system used as the basis. The sign of this equation is to be selected in accordance with the coordinate system for the rotation.

Figure 3:
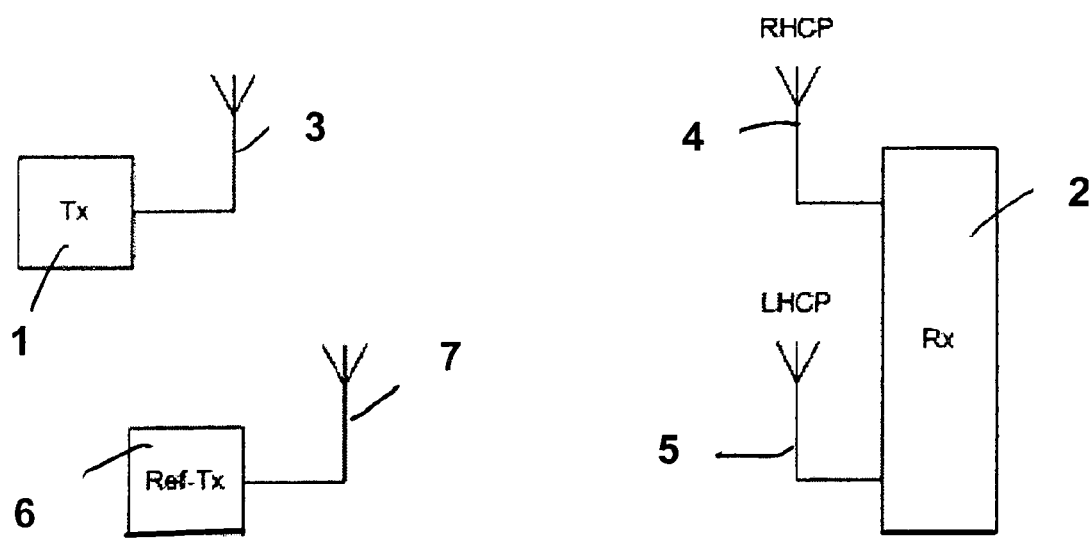
FIG. 3 shows the schematic representation of an apparatus in accordance with FIG. 1 with a reference transmitter.
Figure 4:
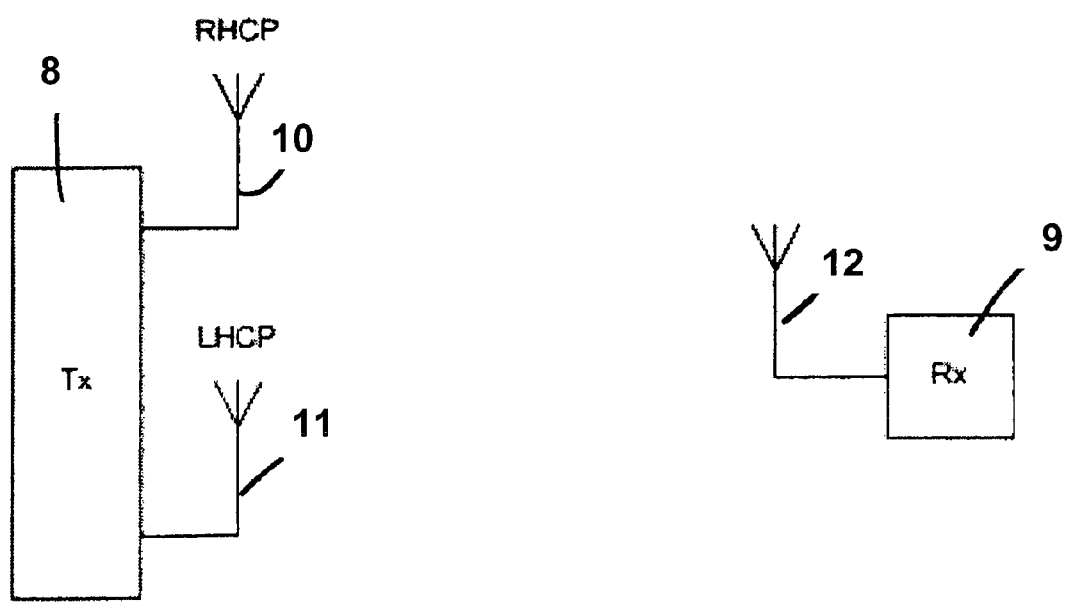
FIG. 4 shows a schematic representation of the apparatus in accordance with the invention in accordance with a further embodiment.

In FIG. 3, a reference transmitter 6 which has a known orientation in a selected coordinate system is provided in addition to the transmitter 1. This reference transmitter 6 is provided with a linearly polarized antenna 7. The apparatus in accordance with FIG. 1 can be calibrated using this reference transmitter to be able to determine an absolute orientation to a known coordinate system. As already described above, for this purpose, the receiver 2 receives via its two antennas 4 and 5 the transmitted signals emitted by the reference transmitter 6 and, as described above, the measured phase values for the two receiver modules of the receiver 2 can be determined. These two measured values are employed together with the known orientation of the reference transmitter $\Omega_{Ref} = \Omega$ in the above equation. $\Omega_o$ art thereby be determined and the absolute orientation is known in a dimension of the object to be localized.

As was stated, a one-dimensional orientation is measurable using the apparatus in accordance with FIG. 1 to FIG. 3. In order, for example, to set up a three-dimensional localization system of a movable object in a limited space such as a so-called tracking of a ball over a playing field, at least four of the above-described receivers 2 should be spatially distributed at different points around the playing field in which the movable object, here the ball, moves. The transmitter 1 which can be found at or in the movable object or its oscillator is not synchronized with the oscillators of the receiver network, with the four receivers 2 being synchronized with one another. This can be done, for example, via a glass fiber line which is connected to all the receivers 2 and obtains signals from a clock generator. Due to the lack of synchronization, the TDOA (time difference of arrival) method has to be applied for the position determination in order to eliminate the unknown transmission time of the transmitter in the equations—at least four receivers are required for this reason.

As described above, measured phase values can be determined for the respective received signals and the distance or distance changes and the angles of rotation can be calculated with them so that the three-dimensional orientation of the transmitter 1 or of the movable object in space can be determined.

In the above-described embodiments, the transmitter 1 is provided with a linearly polarized antenna 3 whereas the receiver 2 has two circularly polarized antennas 4, 5. It is, however, also possible that the measurement system described in this way can be operated "inversely", i.e. that the transmitter 8 includes in accordance with 4 and FIG. 5 two circularly polarized antennas 10, 11, one right-handed and the other left-handed. The receiver 9 is then connected to an antenna 12 with a known polarization plane. Such a system could, for example, be used in a satellite navigation system such as GPS or Galileo, with then each satellite having to be equipped with a transmitter 8 having two transmission antennas. In some embodiments, t two coupled transmitters may be provided instead of a transmitter having two transmitter modules that are connected to the respective antennas 10, 11.

In some embodiments, the transmitted signals generated by the transmitter 8 via two transmission modules have to distinguishable for the receiver 9, but they must have the same frequency if they utilize the same carrier frequency or the frequencies of both transmitted signals have to be rigidly coupled. The carrier frequency for both transmitted signals can, for example, be the same, with a common clock source being able to be used for both transmission modules with the frequency $f_0$. If this is the case, the generated signals have to be modified during modulation for the distinguishability so that the receiver 9 recognizes two signals. For example, the transmitted signals can be emitted as an orthogonal code sequence such as are used in GPS to distinguish the satellites. In some embodiments, the carrier frequencies may be different, but are rigidly coupled, with then the phasing in the receiver 9 being able to be corrected with knowledge of the rigid coupling.

The receiver 9 receives the two signals emitted by the transmission antennas 10 and 11 via its linearly polarized antenna 12 and evaluates them in this process, as above, the carrier phases of both received signals are determined and are compared with the phasing of the transmitted signal or transmitted signals. The measured phase values $\phi_{RHCP}$ and $\phi_{LHCP}$ are in turn determined in this comparison. The evaluation is otherwise as described above.

Figure 5:
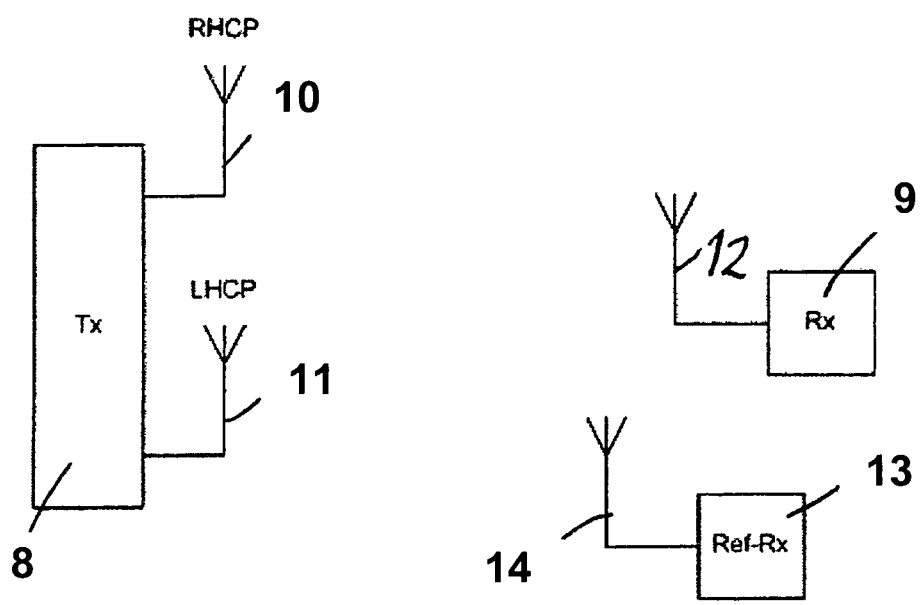
FIG. 5 shows an apparatus in accordance with FIG. 4 in which a reference receiver is additionally used.

In FIG. 5, in accordance with FIG. 3, a reference receiver 13 with a correspondingly linearly polarized antenna 14 whose orientation is known is provided for determining the absolute orientation. This reference station 13 could then, however, also include a transmitter which transmits correction data to the receiver 9 forming the measured object in which receiver then in turn its absolute orientation is determined.

To produce a localization system for the three-dimensional orientation of a movable object including the receiver 9, a plurality of transmitter arrangements 8 are in turn necessary, i.e. at least four, if the receiver 9 is not synchronized with the transmitters 8.

The invention claimed is:

1. An apparatus for determining a distance and an orientation of a movable object, comprising:
    at least one transmitter attached to the object, the at least one transmitter emitting a signal with a defined frequency and having an antenna with a known linear polarization plane;
    at least one receiver configured to receive the signal, the at least one receiver comprising a left-hand circularly polarized antenna and a right-hand circularly polarized antenna; and
    an evaluation device coupled to the at least one receiver configured to determine phase values of the signal corresponding to signal components received by the left-hand circularly polarized antenna and the right-hand circularly polarized antenna and to calculate the distance and the orientation with respect to a preset point based on the phase values; and wherein the at least one transmitter and the at least one receiver are coupled via at least one of a phase-locked coupling and a synchronization.

2. An apparatus in accordance with claim 1, further comprising:
    a reference transmitter having a known position and known orientation; and a reference antenna with a known linear polarization plane configured to determine at least one of an absolute distance and an absolute orientation.

3. An apparatus in accordance with claim 1, wherein the signal is modulated onto a carrier with a defined frequency.

4. An apparatus in accordance with claim 1, wherein a transmitter time and a receiver time are synchronized with one another.

5. An apparatus in accordance with claim 1, further comprising a plurality of receivers having circularly polarized antennas forming a multidimensional localization system in space.

6. An apparatus in accordance with claim 1, wherein the left-hand circularly polarized antenna and the right-hand circularly polarized antenna are each configured as two crossed linear antennas and a phase shifter.

7. An apparatus in accordance with claim 6, wherein the phase shifter is a ninety-degree phase shifter.

8. An apparatus for determining a distance and orientation of a movable object, comprising:
   at least one transmitter comprising a left-hand circularly polarized antenna and a right-hand circularly polarized antenna each configured to emit signals having a defined frequency;
   at least one receiver attached to the movable object comprising an antenna with a known linear polarization plane; and
   an evaluation device coupled to the at least one receiver configured to determine measured phase values associated with the signals emitted by the left-hand circularly polarized antenna and the right-hand circularly polarized antenna and to calculate the distance and the orientation with respect to a preset point based on the phase values,
   wherein the at least one transmitter and the at least one receiver are coupled via at least one of a phase-locked coupling and a synchronization.

9. An apparatus in accordance with claim 8, further comprising:
   a reference receiver having a known position and a known orientation, and
   a reference antenna with a known linear polarization plane configured to determine at least one of an absolute distance and an absolute orientation.

10. An apparatus in accordance with claim 8, wherein the signals are modulated onto a carrier with a defined frequency.

11. An apparatus in accordance with claim 8, wherein the signals are one or more of orthogonal code sequences and burst-like modulations having coupled carrier frequencies.

12. An apparatus in accordance with claim 8, wherein a transmitter time and a receiver time are synchronized with one another.

13. An apparatus in accordance with claim 8, further comprising a plurality of transmitters having circularly polarized antennas forming a multidimensional localization system in space.

14. An apparatus in accordance with claim 8, wherein the left-hand circularly polarized antenna and the right-hand circularly polarized antenna are each configured as two crossed linear antennas and a phase shifter.

15. An apparatus in accordance with claim 14, wherein the phase shifter is a ninety-degree phase shifter.

16. A method for determining a distance and an orientation of a movable object, the method comprising:
   transmitting a signal having a defined frequency with at least one transmitter attached to the object, the at least one transmitter having an antenna with a known linear polarization plane to at least one receiver comprising a left-hand circularly polarized antenna and a right-hand circularly polarized antenna;
   receiving the signal at the left-hand circularly polarized antenna and the right-hand circularly polarized antenna;
   determining phase values of the signal corresponding to signal components received by the left-hand circularly polarized antenna and the right-hand circularly polarized antenna; and
   calculating a distance and an orientation of the movable object relative to a preset point based on the phase values;
   wherein the at least one transmitter and the at least one receiver are coupled via at least one of a phase-locked coupling and a synchronization.

17. A method in accordance with claim 16, further comprising determining an absolute distance and an absolute orientation using reference signals of a reference transmitter with a known position and comprising a reference antenna with a known polarization plane.

18. A method for determining a distance and orientation of a movable object, the method comprising:
   transmitting signals with at least one transmitter having a left-hand circularly polarized antenna and a right-hand circularly polarized antenna to at least one receiver having an antenna with a known linear polarization plane, the at least one receiver being attached to the movable object;
   receiving the signals emitted via the left-hand circularly polarized antenna and the right-hand circularly polarized antenna;
   determining phasings of the signals which are emitted by the at least one transmitter and received by the at least one receiver with respect to a phasing of the at least one transmitter; and
   calculating at least one of a distance and an orientation of the movable object relative to a preset point using the phasings of the signals received by the at least one receiver;
   wherein signal shapes of the signals emitted by the left-hand circularly polarized antenna and the right-hand circularly polarized antenna of the at least one transmitter are selected such that they can be distinguished at the at least one receiver and wherein a phase locked coupling or a synchronization between the at least one transmitter and the at least one receiver is provided.

19. A method in accordance with claim 18, further comprising determining an absolute distance and an absolute orientation using the signals of a reference receiver with a known position and an antenna with a known linear polarization plane.

* * * * *

UNITED STATES PATENT AND TRADEMARK OFFICE
CERTIFICATE OF CORRECTION

| | | |
|---|---|---|
| PATENT NO. | : 8,659,476 B2 | Page 1 of 1 |
| APPLICATION NO. | : 13/055770 | |
| DATED | : February 25, 2014 | |
| INVENTOR(S) | : Eidloth et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 241 days.

Signed and Sealed this

Twenty-ninth Day of September, 2015

Michelle K. Lee
*Director of the United States Patent and Trademark Office*